LOW BACKGROUND NOISE AMPLIFYING SYSTEM FOR ULTRA-SHORT WAVES

Filed July 9, 1949

INVENTORS:
ROBERT WARNECKE
WERNER KLEEN
By: Hazeltine, Lake & Co.
AGENTS

Patented June 22, 1954

2,681,951

UNITED STATES PATENT OFFICE 2,681,951

LOW BACKGROUND NOISE AMPLIFYING SYSTEM FOR ULTRA-SHORT WAVES

Robert Warnecke and Werner Kleen, Paris, France, assignors to Compagnie Generale de Telegraphie Sans Fil, a corporation of France Application July 9, 1949, Serial No. 103,896

Claims priority, application France September 1, 1948

6 Claims. (Cl. 179—171)

Figure 1:
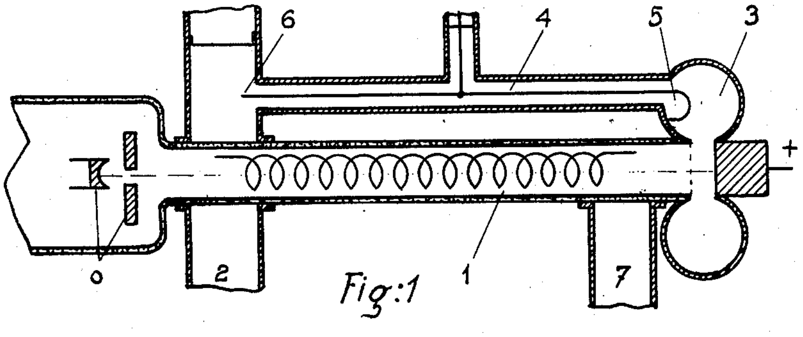

Our invention relates to a thermionic amplifying tube for ultra-high frequency waves and particularly for decimetric and centimetric waves, which differs from the known systems by having a very low noise level.

If the level of noise of the first tube used as an amplifier at the input of a receiver is high, the signal power applied to said tube must also be high so that the signal shall not be covered by the noise variations. The provision of a low noise level amplifier is therefore of primary importance, in particular in the field of decimetric and centimetric waves for which the noise level of external disturbances is very high. Our invention provides the means for constructing such a low noise level amplifier. By these means it is possible substantially to decrease the noise as compared to the known amplifiers.

The principle of the invention consists in a particular improvement in the so-called travelling-wave tubes. According to the invention, use is essentially made, by means of a particular arrangement, of a reaction between the input of the tube and an auxiliary electrode. Assuming that the principle of operation of a travelling-wave tube is known, the invention can be explained as follows. The systems which are the objects of the invention can be described as follows: they form a delay line that serves for guiding a wave which is interacting with an electron beam which is passing across it. The interaction between the wave and the beam comprises a delay of the electrons of the beam by the electric vector of the wave so that a part of the kinetic energy of the electrons is transferred to the wave and said wave is amplified along its travel. Normally, the signal to be amplified is fed to the input of the retardation line and the amplified power of the wave is transferred at the output of said line. The electron current of the beam is collected by a collector which is located behind the delay line and which is raised to about the same positive potential as the delay line.

Tests have shown that the noise level of such a tube is normally very high, making it necessary to have a high signal power at the input for the signal-to-noise ratio to become sufficiently high. But tests have also shown that this noise is due in particular to the distribution of the current between the elements of the delay line and the collector. By measuring the noise fluctuations it is found that the level of said fluctuations is high both in the lead of the delay line and in the lead of the collector, whereas the fluctuations are small if they are measured in a lead through which both the current of the delay line and the current of the collector flow. Therefore, whereas the total current only contains small fluctuations, the fluctuations of the separate currents of the delay line and of the collector are very high.

The cause of these fluctuations is not yet sufficiently accurately known, but it is well known that a distribution of current between two positive electrodes produces a very considerable noise, called current distribution noise, in each of said electrodes and this noise may be greater than the noise contained in the total current. It is obvious that the noise fluctuations in an electrode that participates in this distribution of current are in phase opposition with the noise fluctuations of the other electrode. As regards travelling-wave tubes, the electrodes between which the distribution of current takes place, i. e. those which are the cause of the distribution noise, are the delay line and the collector.

Figures 2, 3, 4:
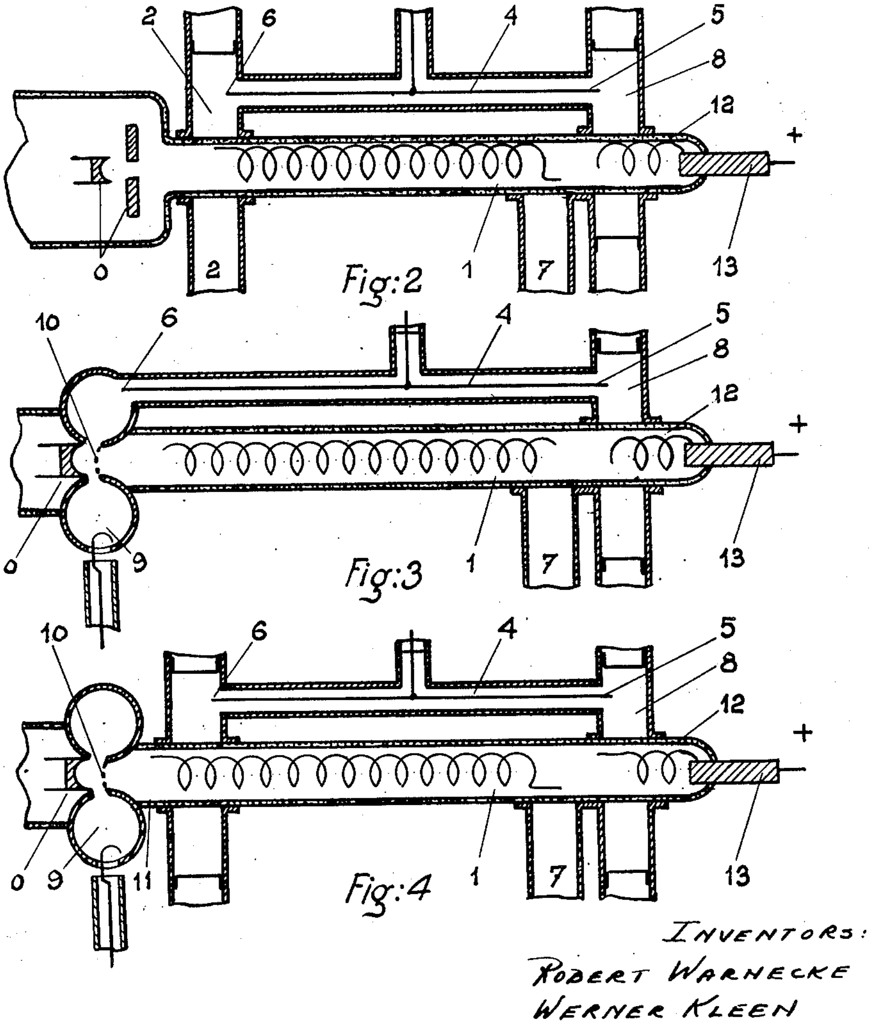

According to the general principle of the present invention, the collector of the tube is constructed in the form of an oscillating circuit and a reaction is applied between said oscillating circuit of the collector and the input of the tube. The value of said reaction is so chosen that the distribution noise is elimated. Some possible diagrams of the circuit are shown in Figs. 1 to 4. In Fig. 4, the reference numeral 0 is the electron gun, 1 represents the delay line of any shape, shown by way of example in the shape of a helix, 2 is the input of the tube, said input being shown, likewise by way of example, as a waveguide coupled to the input of the delay line. 3 is the collector shown in the shape of a cavity, 4 is a line coupled between the cavity (at the point 5) and the input of the tube 6. 7 is the output of the tube, for example a waveguide coupled to the output of the delay line.

Contrary to the known reaction circuits, the reaction does not take place between the output and the input of the tube, but between the input and an auxiliary electrode (collector) which, together with the output electrode (delay line, helix), is the cause of the distribution noise. It should be noted that a reaction between the output and the input would not in any way change the signal-to-noise ratio of the tube.

In order to obtain a reaction of suitable value throughout the entire band-pass of the tube, which is fairly wide, it is necessary to use as a collector a cavity with a low Q-factor, so that the band-pass of said cavity is of the same order of magnitude as the band-pass of the tube. But even in the case in which this condition is not fulfilled, an improvement in the signal-to-noise ratio is nevertheless obtained, without however enabling the optimum possible improvement to to be effected.

In practice, it is rather difficult to construct a collecting cavity with a sufficiently wide band-pass. According to a further feature of the invention, the band within which the reaction is effective is widened by using, instead of a cavity, an additional helix which is separate from the delay line used for the amplification of the wave, said additional helix being connected to a solid collector which is suitable for dissipating the heat. Fig. 2 shows such a device, wherein the same reference numerals denote the same elements as in Fig. 1, the cavity 3 of Fig. 1 being replaced by a collecting helix 12 connected to a solid collector 13. Reaction between 12 and the input of the tube is obtained by means of any reaction channel, and in Fig. 2, by way of example, said channel comprises a guide 8 coupled to the collecting helix 12 and a coaxial line 4 that couples the guide 8 to the guide 2 at the input of the tube.

The invention is not restricted to tubes in which the signal is fed to the input of the delay line. Travelling-wave tubes are also known in which the signal is applied to a grid near the cathode, that effects a density-modulation of the cathode current. This density-modulated current flows into a delay line which acts as the output circuit of the tube and at the end of which the amplified power is transferred to the load, the electron beam being collected by a collector which is located behind the output end of the delay line. The phenomena that cause the considerable noise produced by the current distribution are the same in this tube as hereinbefore. The principle of the invention can therefore also be applied to such a tube, and Figs. 3 and 4 show two different embodiments of such an application. In Fig. 3, the reaction is introduced between a collecting helix 12 and a cavity resonator 9 which is located between the cathode 0 and the control grid 10. In the system shown in Fig. 4, the reaction is introduced between a collecting helix 12 and the input 11 of the delay line 1 mounted in a tube which is otherwise identical to the tube of Fig. 3, this method producing the same effect of eliminating the fluctuations caused by the distribution of the current. In both Figs. 3 and 4, the other reference numerals used denote the same elements as in Figs. 1 and 2.

The invention is not restricted to the examples which have been described and illustrated but can, on the contrary, be subjected to any modifications which may be within the reach of an expert.

What we claim is:

1. In a travelling wave tube including a tube input, a cathode, a delay line having an input and an output, and a collector: means for decreasing the background noise comprising a feedback channel coupled to the collector and to the tube input, and output delivering means separate from said feedback channel and coupled to the delay line output at a point of the delay line spaced from the point at which said feedback channel is coupled thereto.

2. A travelling wave tube as claimed in claim 1 wherein the tube input is coupled to the delay line input.

3. A travelling wave tube as claimed in claim 1 further comprising a density modulator grid located between the cathode and the delay line input, and a cavity resonator connected to said grid and coupled to the tube input.

4. A travelling wave tube as claimed in claim 1 further comprising a cavity resonator of low Q-factor connected to the collector.

5. A travelling wave tube as claimed in claim 1 further comprising an auxiliary delay line connected to the collector and coupled to said feedback channel.

6. A travelling wave tube as claimed in claim 1 further comprising a density modulator grid located at the tube input, and a cavity resonator connected to said grid and connected between said feedback channel and the tube input.

References Cited in the file of this patent

UNITED STATES PATENTS

| Number | Name | Date |
|---|---|---|
| 2,367,295 | Llewellyn | Jan. 16, 1945 |
| 2,521,760 | Starr | Sept. 12, 1950 |
| 2,580,007 | Dohler et al. | Dec. 25, 1951 |
| 2,595,698 | Peter | May 6, 1952 |

OTHER REFERENCES

Article by Kompfner, Proceedings of the Institute of Radio Engineers, February 1947, pp. 124–127.

Article by J. R. Pierce, pp. 439–442, inclusive, Bell Lab. Record, December 1946.